Figure 7:
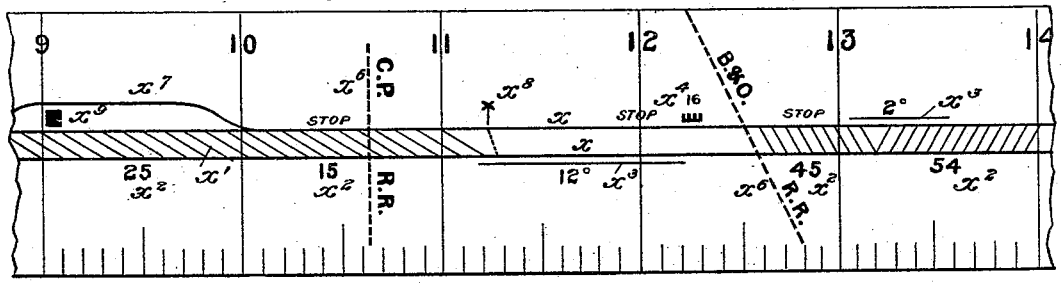

(No. Model.) 2 Sheets—Sheet 1.
S. G. CLARK.
INDICATOR FOR LOCOMOTIVE ENGINEERS.
No. 494,189. Patented Mar. 28, 1893.
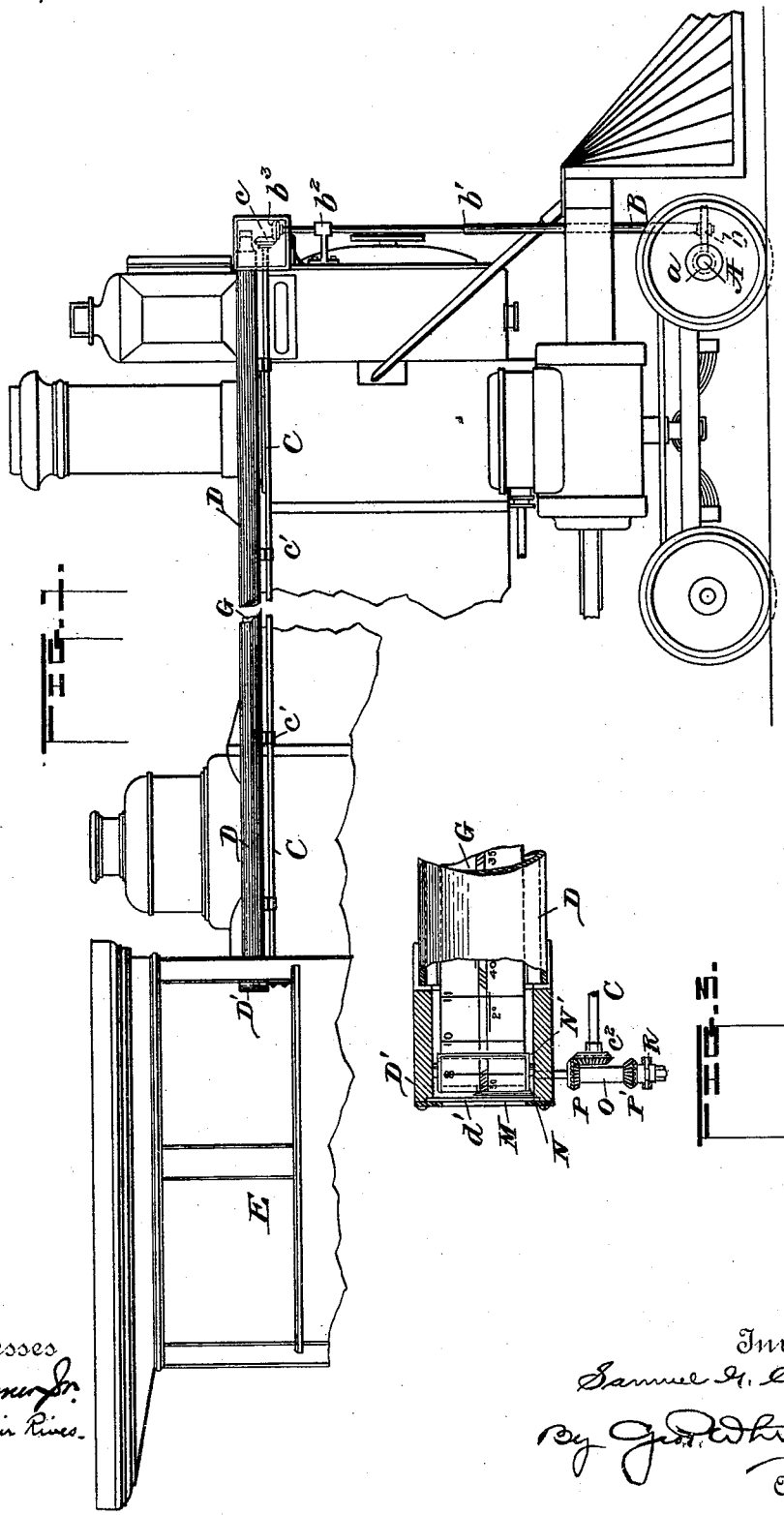
Witnesses
Inventor
Samuel G. Clark,
By Geo. P. Whittlesey
Attorney (No Model.) 2 Sheets—Sheet 2.

S. G. CLARK.
INDICATOR FOR LOCOMOTIVE ENGINEERS.

No. 494,189. Patented Mar. 28, 1893.

Witnesses
Inventor
Sam'l G. Clark,
By Geo. H. Whittlesey
Attorney

THE NORRIS PETERS CO., PHOTO-LITHO., WASHINGTON, D. C.

UNITED STATES PATENT OFFICE.

SAMUEL G. CLARK, OF STEVENS POINT, WISCONSIN.

INDICATOR FOR LOCOMOTIVE-ENGINEERS.

SPECIFICATION forming part of Letters Patent No. 494,189, dated March 28, 1893.

Application filed May 23, 1892. Serial No. 434,115. (No model.)

*To all whom it may concern:*

Be it known that I, SAMUEL G. CLARK, a citizen of the United States, residing at Stevens Point, in the county of Portage and State of Wisconsin, have invented certain new and useful Improvements in Road-Indicators for Locomotive-Engineers; and I do declare the following to be a full, clear, and exact description of the invention, such as will enable others skilled in the art to which it appertains to make and use the same, reference being had to the accompanying drawings, and to the letters of reference marked thereon, which form a part of this specification.

My invention relates to railroading, and its object is to furnish a locomotive engineer with a traveling chart or panorama of the road, so that he may at all times have before him accurate information of the grades, curves, crossings, bridges, mileposts, stations, sidings and other facts concerning the road, for several miles before and behind him. The importance of such a device cannot be overestimated. It enables the engineer to know just where he is on dark or foggy nights when land-marks are obscured or invisible. It shows him just how far he is from a station in case of a break down. Should he find on arriving at a station that his train has broken in two, he can tell by a glance at the chart whether he is on a down grade, and likely to be run into by the rear portion of his train, and how far he must run ahead to reach an up grade: or if on an up grade, he can instantly see how far back he must go to pick up the lost cars and can inform the telegraph operator about where they must be and thus avert collisions with following trains.

My invention is also of great value in teaching new engineers about the road: so that in case of a strike, but little delay need be incurred in breaking in green hands. It has been demonstrated that an engineer entirely unfamiliar with the road can, with the aid of my invention, take a train over the road on time, and without mishap.

My invention consists in an endless belt, running around rollers in an inclosing casing, and driven by gearing connected with one of the axles of the truck. The belt passes behind a glass covered opening arranged at a convenient place in the cab so as to be always before the engineer. The belt is graduated into miles and fractions thereof and bears suitable marks to indicate grades, curves, &c. A pointer fixed to the casing shows the exact position of the engine at any given moment.

Figure 8:
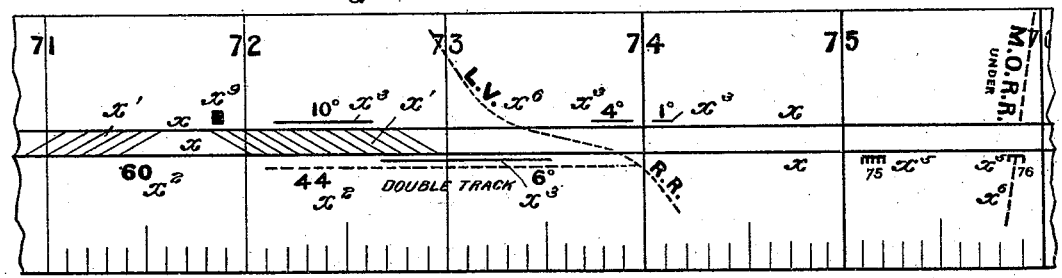
Figure 2:
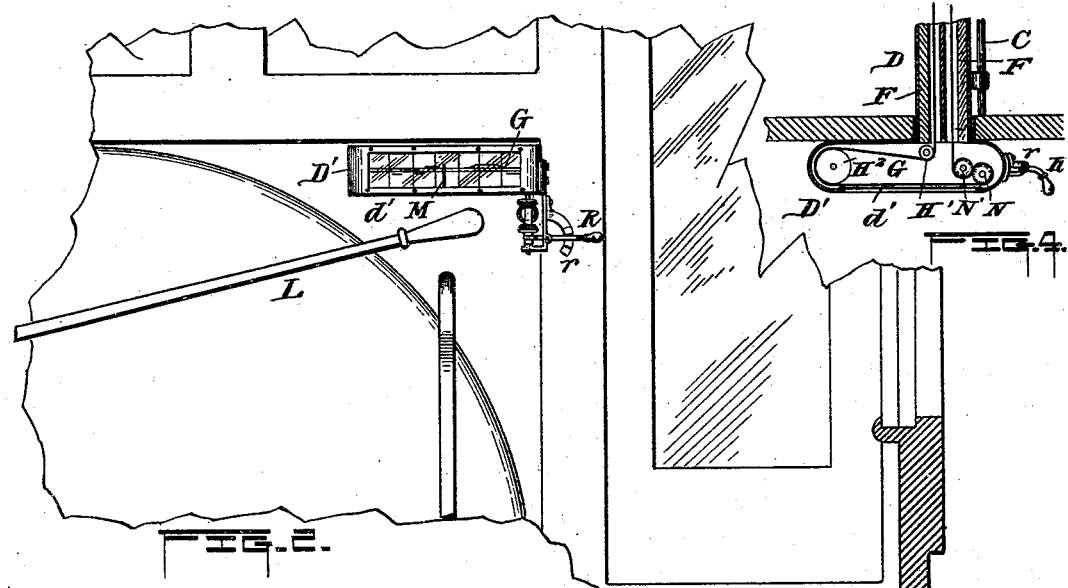
Figures 5, 6:
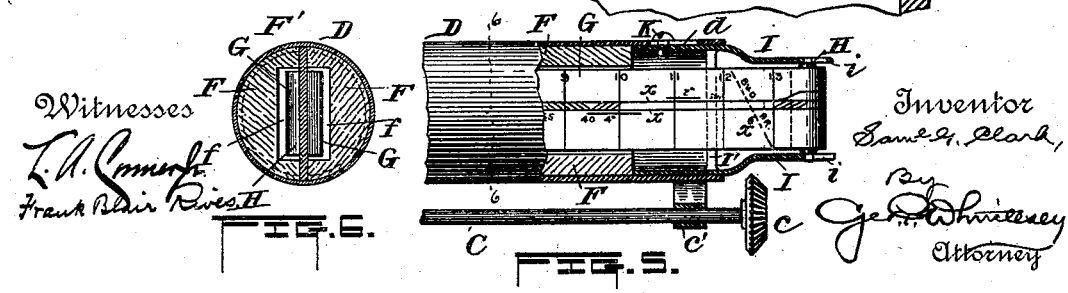

In the drawings, Figure 1 is a side elevation of a locomotive, partly broken away, and equipped with my invention. Fig. 2 is a view of a portion of the cab looking forward. Fig. 3 is a longitudinal section of the rear end of the casing. Fig. 4 is a top plan sectional view of the same. Fig. 5 is a longitudinal section of the front end of the casing. Fig. 6 is a cross section on the line 6—6 Fig. 5. Figs. 7 and 8 show portions of the endless belt, or traveling chart.

Secured to the forward axle A of the locomotive truck, is a worm $a$ which meshes with a worm gear $b$ secured to the lower end of an upright shaft B, which is journaled in suitable bearings, and is composed of two parts telescoping together at $b'$ to allow for the vertical play of the truck. The lateral play is provided for by a swiveled upper bearing $b^2$ or some other equivalent device. The shaft B carries at its upper end a small miter gear $b^3$, which meshes with a similar gear $c$ on the front end of a horizontal shaft C, which rotates in bearings $c'$ attached to the under side of the hand rail D: or if preferred, this shaft may be inclosed inside the rail. The shaft extends back into the cab E, where it is connected by suitable mechanism with the rolls which drive the endless belt. The hand rail D is hollow being composed preferably, of a three inch metal tube. In Fig. 1 both the rail and the shaft are shown of exaggerated size for the sake of clearness. Inclosed within the rail are filling pieces F, of wood extending nearly the entire length of the rail and separated by a thin vertical strip F'. The filling pieces have recesses $f$ which with the dividing strip F' form two parallel passages in which the endless belt G travels. The band G is preferably a commercial rubber belt, that is a belt made of layers of rubber and canvas, and having a smooth white surface. On this surface, are placed the required data to constitute a chart of the road, as will be hereinafter set forth. The belt passes around a roller H at the front end of the hand rail D. This roller is preferably journaled in slots $i$ in the ends of two arms I, united by a bar I', and slipped into the front end of the hand rail D, where they are secured by a screw K passing through a slot $d$ in the rail, whereby the front roller H is rendered adjustable and removable. The rear end of the rail D connects with a box D', placed in the cab preferably just above the throttle valve lever L, and about on the level of the engineer's eyes. The back of the box is open, to disclose the band G, a glass plate $d'$ protecting said band from injury. The opening is long enough to reveal some nine or ten inches of the band. A pointer or index M is fixed at about the middle of the opening. The band G passes around idle rollers H H', and between two rubber covered feed rolls N N' in the box D', passing close behind the glass $d'$ and the pointer M. The shaft of the feed roll N is extended through the bottom of the box D', and has splined upon it a sleeve O carrying two beveled gear wheels P P', adapted to mesh with a bevel gear wheel $c^2$ on the rear end of the shaft C. The sleeve O can be moved up and down to bring one or the other of the gears P P' into mesh and thus cause the belt to run in either direction. A small lever R engaging a grooved collar on the sleeve and locking into notches in a quadrant $r$ enables the sleeve to be shifted, and to be locked with either one of the gears P P' in mesh with the gear $c^2$, or with both gears out of mesh, as desired.

The operation of the mechanism is as follows: The revolution of the axle A drives the shafts B and C and causes the endless belt G to slowly travel past the pointer M. When returning over the route, the sleeve O must be shifted, to reverse the motion of the belt, since the axle A always revolves in the same direction. Should the indications on the belt fail to correspond with the actual position of the locomotive—the wheels P P' can be thrown out of gear and the rollers turned by hand until the proper mark coincides with the pointer. It now remains to describe my manner of arbitrarily indicating the profile of the road, the curves, crossings, &c. The belt is graduated into miles, half miles, and tenths as shown, allowing about one and a-half inches to the mile. Each mile post is numbered. I represent the single track or line of the road by two parallel lines, $x\,x$, say three-sixteenths of an inch apart. Grades are indicated by a series of parallel diagonal lines $x'$ inclining upward toward the summit of the grade. The gradient or number of feet rise to the mile, is plainly marked, as at $x^2$. A curve is indicated by a straight line as $x^3$ drawn on that side of the lines $x\,x$ toward which the track deflects. The length of the curve is shown by the length of this line $x^3$, and the degree of curvature by the proper number written alongside the line. The bridges are indicated by the symbols shown at $x^4\,x^5$, a through span being shown by the short parallel vertical marks being on the upper side of the horizontal line, while a deck span is shown by the reverse as at $x^5$. Railroad crossings at grade are shown by dotted lines as at $x^6$, while roads passing under the track are shown as at right of Fig. 8. A section of double track is indicated by a dotted line parallel with the line $x\,x$, while a siding is shown as at $x^7$. A carriage road crossing is shown by a miniature sign post, as at $x^8$, while stations are indicated by square black spots as at $x^9$. These simple symbols give at a glance all the facts necessary for the engineer to know, and since a considerable portion of the belt is exposed under the glass $d'$, he has several miles of road always in view.

The use of an endless belt, instead of a strip, winding and unwinding on drums, is a necessity in a machine of this kind, in order to insure an absolutely invariable rate of travel for the belt. By allotting an inch and a-half of belt to the mile of road, a belt thirteen feet long is ample for a one hundred mile run. To provide for all contingencies, however, I adapt one of the hand rails for a casing, as described, and am thus able to use an endless belt long enough for any run that a locomotive is likely to make. The rubber belt described is non-elastic, and hugs the feed roll tightly and with no slip. The adjustable roller H permits all slack to be taken up: while its removability enables me to remove the belt when necessary.

Having thus described my invention, what I claim, and desire to secure by Letters Patent, is—

1. The combination with a locomotive of a casing running from the cab to the front of the engine, guide rollers and feed rollers in said casing, an endless belt traveling around said rollers, an upright shaft geared to one of the truck axles, and connected with one of the feed rollers, means for causing the continuous forward rotation of the truck axle to drive the belt in either direction at will, a glass plate covering an opening in the rear portion of the casing, said opening revealing a considerable portion of the belt, and a pointer fixed near the middle of said opening, said belt containing a chart of the road, substantially as described.

2. The combination with a locomotive, of a hollow hand rail running along the boiler and opening at its rear end into the cab, an endless belt indicator traveling in said rail, and exposed to the engineer at the rear end thereof, and driving mechanism connected with the truck, substantially as described.

3. The combination with a locomotive having a hollow hand rail, of a box in the cab communicating with said rail, and having an open glazed front, rollers in said box and at the front end of the rail, an endless belt passing around said rollers, and driving mechanism connected with the truck, substantially as described.

4. The combination with a locomotive, of a hollow hand rail running along the boiler and recessed filling pieces inclosed in said rail, whereby chambers are formed for an endless belt indicator, substantially as described.

5. The combination with a locomotive of a hollow hand rail running along the boiler, filling pieces inclosed in said rail, having registering recesses, and a thin strip clamped between the filling pieces to form a partition between the recesses, substantially as described.

6. The combination with the hollow rail D, of the recessed filling pieces F, the thin strip F' clamped between them, the adjustable and removable roller H at the front end of the rail, and the box D' at the rear end thereof containing rollers H' H² and feed rolls N N', substantially as described.

7. The combination with a locomotive of the vertical shaft B geared to one of the truck axles, the horizontal shaft C geared to the shaft B, and running back to the cab, the casing D D', the feed rolls N N', one of which gears into the shaft C, the rollers H H' H² and means for reversing the motion of the feed rolls, substantially as described.

In testimony whereof I affix my signature in presence of two witnesses.

SAMUEL G. CLARK.

Witnesses:
FRANK B. LAMOREUX,
F. J. CARPENTER.